United States Patent [19]

Nakahata et al.

[11] Patent Number: 5,346,398
[45] Date of Patent: Sep. 13, 1994

[54] STATIONARY GAME MACHINE

[75] Inventors: Hiroki Nakahata, Yokohama; Yoshinori Satoh, Kawasaki; Tatsuhisa Yabushita, Tokyo, all of Japan

[73] Assignee: Namco Ltd., Tokyo, Japan

[21] Appl. No.: 916,667

[22] Filed: Jul. 22, 1992

[30] Foreign Application Priority Data

Jul. 26, 1991 [JP] Japan .................................. 3-210125

[51] Int. Cl.$^5$ ........................ G09B 9/05; A63G 31/16
[52] U.S. Cl. ...................................... 434/70; 434/67; 273/442
[58] Field of Search ................ 273/441, 442; 434/33-39, 55, 61, 62, 64, 65, 67, 69-71

[56] References Cited

U.S. PATENT DOCUMENTS

| 4,415,152 | 11/1983 | Smith | 434/61 X |
| 4,464,117 | 8/1984 | Foerst | 434/67 |
| 4,932,651 | 6/1990 | Defaux | 434/61 X |
| 4,978,300 | 12/1990 | Letovsky | 434/61 |

FOREIGN PATENT DOCUMENTS

| 571863 | 3/1933 | Fed. Rep. of Germany | 434/70 |
| 609033 | 2/1935 | Fed. Rep. of Germany | |
| 310379 | 4/1937 | Italy | 273/442 |
| 425285 | 5/1967 | Switzerland | 434/67 |

Primary Examiner—Paul E. Shapiro
Attorney, Agent, or Firm—Oliff & Berridge

[57] ABSTRACT

A stationary game machine can responds to steering by a player to change the orientation of a dummy mover such a vehicle or the like, and also to translate the dummy mover in a direction crossing the dummy mover's path of movement at a speed corresponding to the changed orientation. The game machine can comprise a stationary vehicle used as the dummy mover and an endless belt representing a road as the path of movement.

As the scenes on and in the road change in association with the movement of the endless belt, a steering wheel is rotated by the player to change the orientation of the vehicle and, at the same time, to translate the vehicle in the transverse direction. Tile translation of the vehicle is accomplished by a combination of a rotating shaft with a pressure roller contacting the rotating shaft, the cross-angle between the rotating shaft and the pressure roller being controlled to generate a thrust for translating the vehicle.

17 Claims, 13 Drawing Sheets

STATIONARY GAME MACHINE

BACKGROUND OF THE INVENTION

1. Field of the Invention

The present invention relates to a stationary game machine and particularly to a stationary game machine which comprises a dummy mover and a path of movement displayed in front of the dummy mover, the latter being control led to move along the path of movement by a player.

2. Description of the Related Art

One such game machine; known in the art is a drive game machine to control a vehicle along a road represented on an endless belt. As the endless belt is driven, various different scenes appear on the road represented on the endless belt. When a player controls a steering wheel following such changes on the road, the vehicle is steered by the player.

The road represented on the endless belt is variable not only in the direction of belt length, but also in the direction of belt width. Merely by controlling the steering wheel to turn the vehicle, the vehicle can be moved out of the road.

In such a game machine, therefore, the vehicle is adapted to move above the endless belt in the direction of belt width. As the steering wheel is operated by the player, the position of the vehicle is turned and at the same time the vehicle translates in the direction of belt width at a speed corresponding to the turning speed. In such a manner, the player is pleasured by driving the vehicle oil the variable road while avoiding obstructions represented on the endless belt.

In order to move the vehicle in the direction of belt width, the game machines of the prior art utilize a ball screw. This requires a reversible motor for rotatably driving the ball screw in the forward direction, thereby moving the vehicle rightwardly in the direction of belt width, and in the backward direction to move the vehicle leftwardly. A motor control circuit is further required which controls the forward and backward rotations of the motor rapidly in response to the movement of the steering wheel. In addition, the reversible motor used must have a rapid response to the control signal and an increased start-up output. As a result, the game machines will be or a complicated and expensive structure.

Where the ball screw is used in a game machine to move the vehicle in the direction of belt width, it is further required to control the rotational speed of the motor to control the speed of the vehicle moving in the direction of belt width, depending on the steering angle of the steering wheel. In other words, the speed of the vehicle moving in the direction of belt width must be controlled more slowly when the steering angle is smaller and more rapidly when the steering angle is larger. This also makes the motor control circuit for driving the ball screw complex and expensive.

SUMMARY OF THE INVENTION

It is therefore, an object of the present invention to provide a stationary game machine of a simplified structure which can control the orientation of a dummy mover, as in the form of a vehicle, and move the dummy mover transversely in a direction perpendicular to a path of movement at a speed corresponding to the steered orientation of the dummy mover when a steering wheel is actuated by a player.

To this end, the present invention provides a stationary game machine comprising:

a dummy mover having a player's seat;

display means for displaying a path of movement in front of said dummy mover; and means responsive to the steering by the player for controlling the orientation of said dummy mover, said means for controlling the orientation of said dummy mover comprising:

a truck section transversely movable in a direction crossing said path of movement, said truck section pivotally supporting said dummy mover so that the orientation thereof can be controlled;

an angle control section responsive to the steering by the player for controlling the pivoted angle of said dummy mover relative to said truck section;

a rotating member disposed in a direction crossing said path of movement;

a pressure roller disposed on said truck in pressure contact with said rotating member;

a drive section for rotatably driving one of said rotating member and pressure roller; and a cross-angle control section for control ling a cross-angle of said pressure roller relative to said rotating member such that a component of force acting on said truck through said pressure roller in said crossing direction will be in the same direction as said steered direction and equal to a value corresponding to said pivoted angle, whereby said dummy mover can be steered and transversely moved by the player in said crossing direction at a speed matching the orientation of said dummy mover.

The path of movement is displayed by the display means in front of the dummy mover. The player can get on the dummy mover and steer it along the displayed path of movement.

For player steering, the angle control section controls the pivoted angle or the dummy mover relative to the truck section. Thus, the orientation of the dummy mover will be controlled to match the steered direction.

The cross-angle control section controls the cross-angle between the pressure roller and rotating member such that the component of force acting on the truck section through the pressure roller in the crossing direction will be in the same direction as said steered direction and equal to a value corresponding to said pivoted angle.

Therefore, the truck section will transversely move in the direction crossing the path of movement at a speed corresponding to the cross-angle. Since the dummy mover is carried on the truck section, the dummy mover will move with the truck section as a unit.

Only by changing the cross-angle between the rotating member and the pressure roller, can the present invention vary the magnitude and direction of said component of force to move the dummy mover transversely in the crossing direction. Unlike the related art, the present invention does not require various complicated controls such as switching between the forward and backward rotations of the drive motor, adjustment of the rotational speed in the motor and so on. The entire control circuit for the game machine can be simplified and manufactured with reduced cost.

In accordance with the present invention, it is only required to rotatably drive at least one of the rotating member and pressure roller in one direction through the use of the drive section. Thus, the present invention does not require frequent start and stop operations as in the related art. This means that the game machine of the present invention does not require a drive motor having a higher starting torque as in the related art. Also from this aspect, the entire structure of the game machine can be manufactured with reduced cost in accordance with the present invention.

DETAILED DESCRIPTION OF THE PREFERRED EMBODIMENTS

Figure 1:
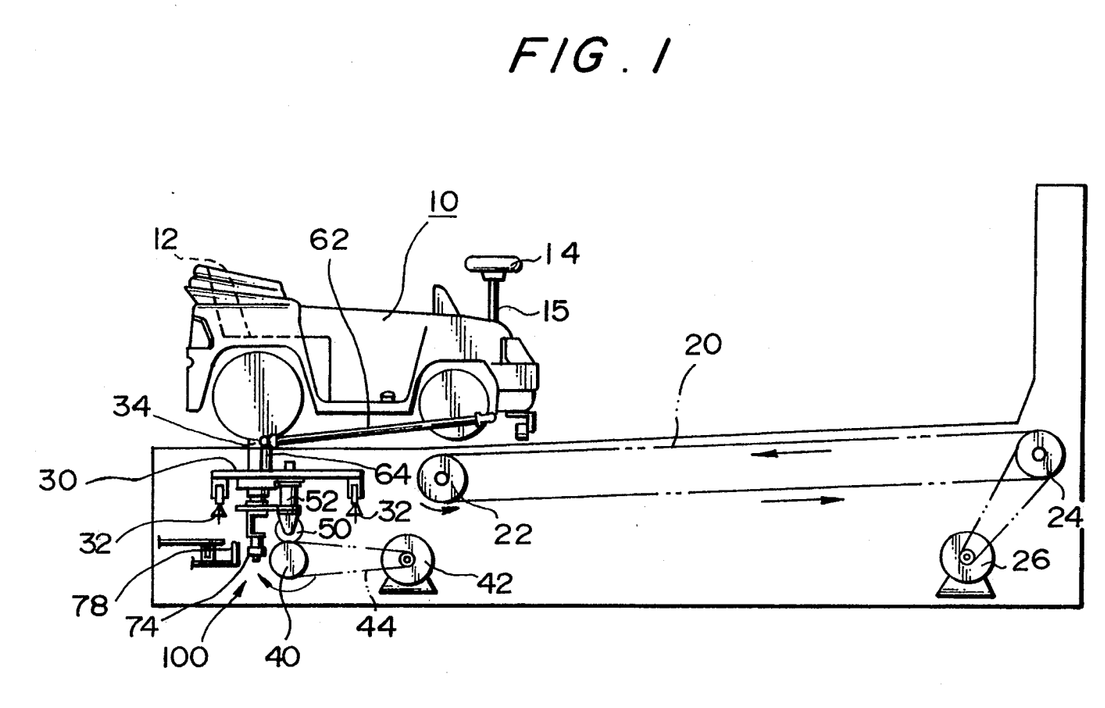
FIG. 1 is a schematic side view of one preferred embodiment of a stationary game machine constructed in accordance with the present invention.
Figure 2:
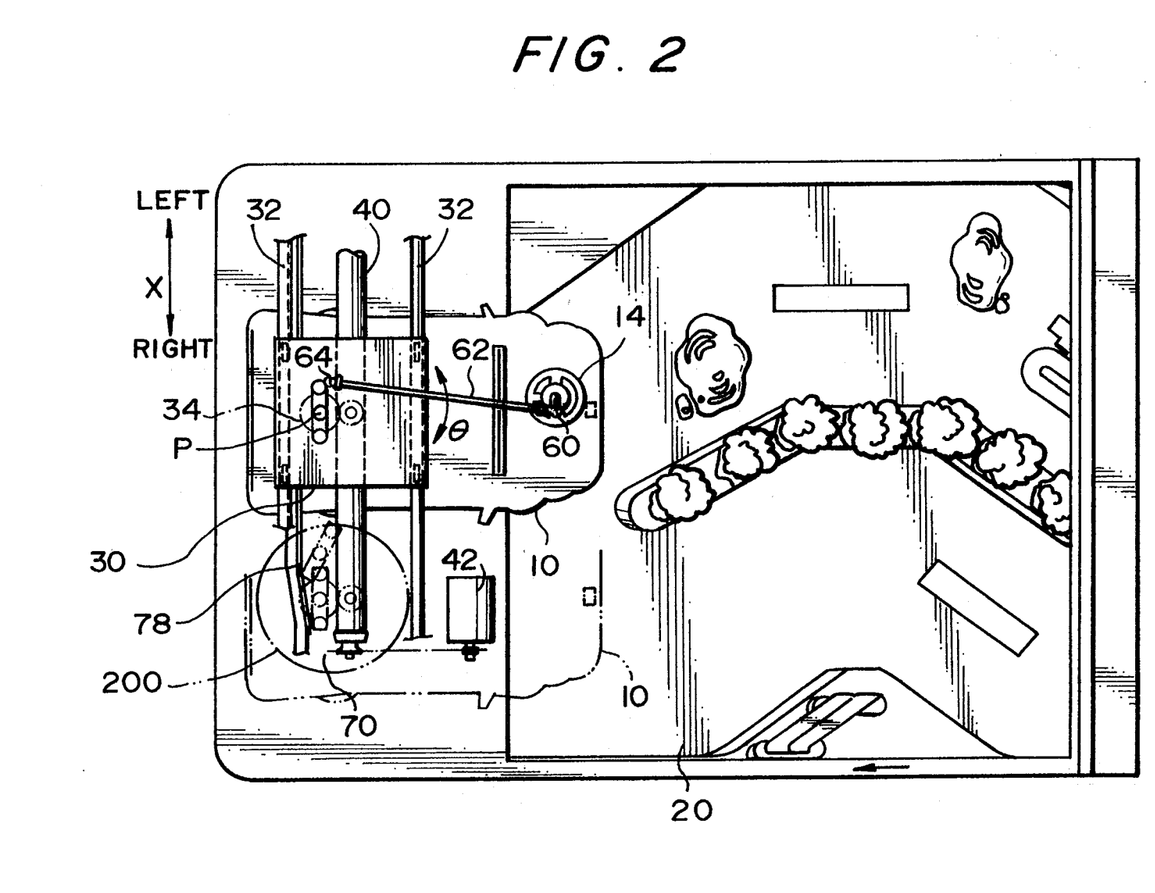
FIG. 2 is a schematic plane view of the game machine strewn in FIG. 1.

Referring to FIGS. 1 and 2, there is shown a stationary drive game machine which comprises a vehicle 10 as a dummy mover and an endless belt 20 as a display means. Tile endless belt 20 spans and passes around two pulleys 22 and 24 which are located at different heights such that the surface of the upper run of the belt 20 can be more easily viewed by a player with the pulley 24 being in a position slightly higher than the pulley 22. The pulley 24 is operatively connected with a motor 26. When the motor 26 is energized, the pulley 24 is driven to move the endless belt 20 in a direction as shown by an arrow in FIG. 1.

Figure 3:
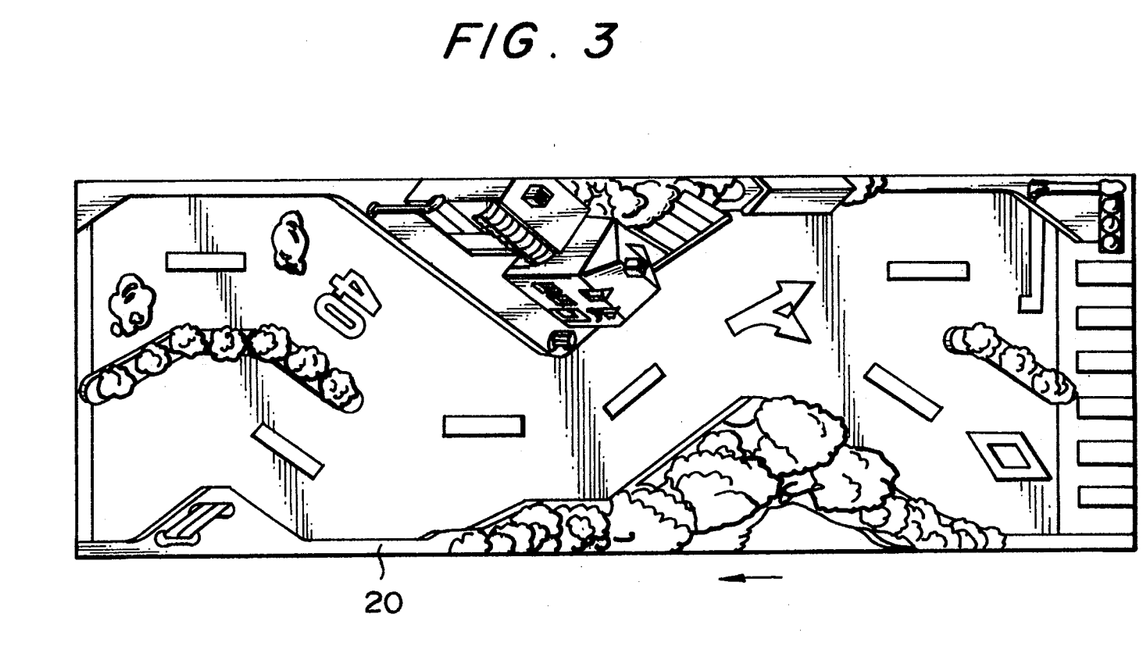
FIG. 3 is a development view of an endless belt usable in the present embodiment.

A road and associated scenes representing a path of movement for the vehicle 10 are printed on the outer surface of the endless belt 20. FIG. 3 strews the endless belt 20 in its development state. As seen from this figure, the road and various obstructions are printed on the surface of the endless belt 20. As the endless belt 20 is moved in the direction of an arrow in FIG. 3, these road and scenes will be changed into various forms.

The vehicle 10 is steered when the player get on a seat 12 operates a steering wheel 14 depending on variations of the road represented on the endless belt 20.

As seen from FIG. 2, the direction of movement in the vehicle 10 is controlled in a combination of the control of steering angle $\theta$ about a rotational center P in the truck 30 with the control of translation in the transverse direction (X-direction in FIG. 2) at a speed corresponding to the steering angle $\theta$. When the player operates the steering wheel 14 depending on variations on the endless belt 20, the steering angle $\theta$ in the vehicle 10 is controlled. In order to provide a feel of moving the vehicle 10 in the steered direction, the vehicle 10 is additionally translated in the direction of X-axis at the speed corresponding to the steering angle $\theta$.

In such a manner, the vehicle 10 can be control led with respect to its direction of movement as if it actually runs along the road on the endless belt 20.

In order to perform such a control, the game machine comprises a truck 30 pivotally supporting the vehicle 10 through a support shaft 34, as shown in FIG. 1. Tile game machine further comprises a pair of parallel guide rails 32 extending across the endless belt 20 in the direction of belt width. The truck 30 is movably supported by the guide rails 32. Below the truck 30, a rotating shaft 40 as a rotating member is rotatably positioned parallel to the guide rails 32. The rotating shaft 40 is rotatably driven by a motor 42 through a belt 44 in a direction as shown by an arrow in FIG. 1.

The truck 30 comprises a pressure tel let 50 fixedly mounted thereon through a support shaft 52. The pressure roller 50 is in contact with the rotating shaft 40 under pressure.

Figure 4:
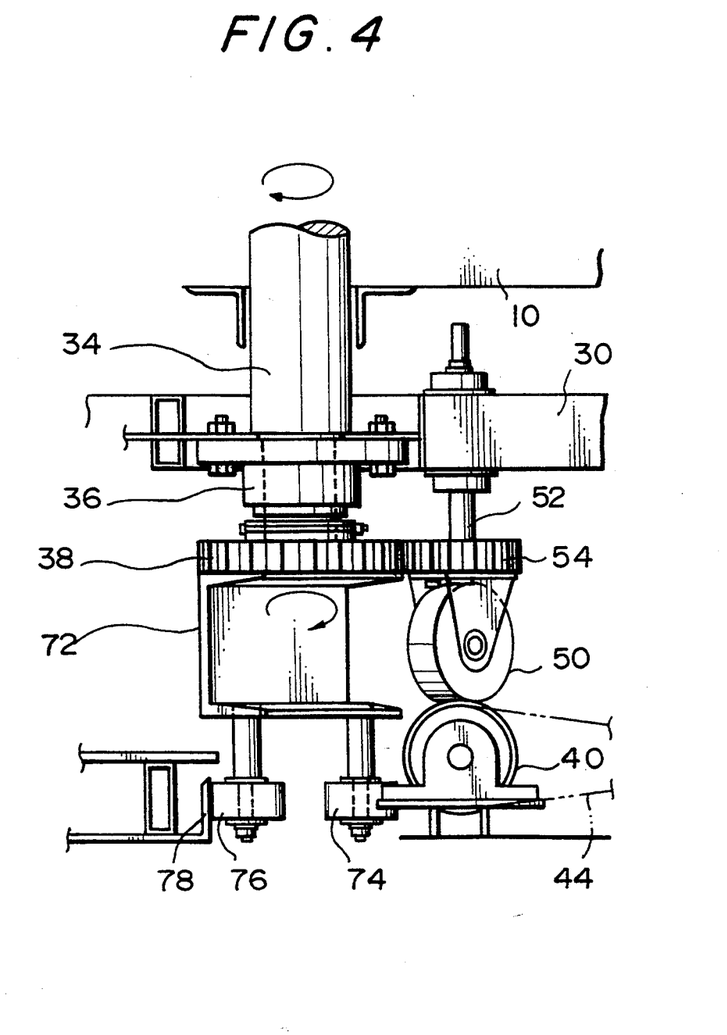
FIG. 4 is an enlarged view of the primary mechanism in a means for control ling orientation usable in the present embodiment.

FIG. 4 shows all enlarged view of parts generally indicated by 100 in FIG. 1.

As shown in FIG. 4, the support shaft 52 supporting the pressure roller 50 is rotatably supported by the truck 30 and includes a gear 54 fixedly mounted thereon at one end.

The support shaft 34 supporting the vehicle 10 is rotatably supported by the truck 80 through a roller bearing 36. The vehicle 10 is fixedly mounted on the top of the bearing 36. A gear 38 is fixedly mounted below the bearing 36 and engaged by the gear 54.

As shown in FIGS. 1 and 2, the steering wheel 14 is fixedly connected to a steering shaft 15 which includes an arm 60 fixedly mounted thereon. The outer end of the arm 60 is pivotally connected to a rod 62 at one end. The other end of the rod 62 is pivotally connected to one end of a pole 64 which stands from the truck 30. As the steering wheel 14 is rotated rightwardly, the vehicle 10 is rotated rightwardly about the support shaft 34 as the rotational center P. When the steering wheel 14 is rotated leftwardly, the vehicle 10 is rotated leftwardly.

As seen From FIG. 4, thus, the rotation of the vehicle 10 from the actuation of the steering wheel 14 will be transmitted to the support shaft 52 through the support shaft 34 and gears 38, 54 (although gears are depicted herein, it should be understood that a chain would be equally effective as a power transmitting mechanism). At this time, the gear 38 is rotated in the opposite direction to the rotation of the gear 54. Thus, the cross-angle between the pressure roller 50 and the rotating shaft 40 becomes reverse to the direction of rotation in the vehicle 10 (steering angle $\theta$).

The pressure roller 50 receives a rotational drive Force from the rotating shaft 40 which is rotatably driven by the motor 42.

Figure 5A:
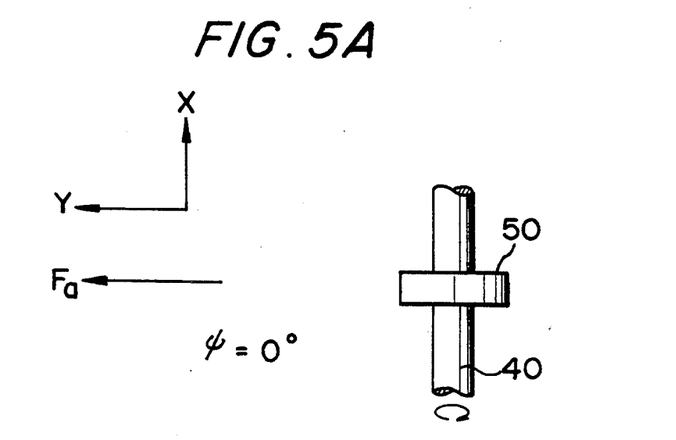
FIGS. 5A, B and C illustrate the relationship between the cross-angle between a rotating shaft and the pressure tel and a thrust acting on the truck.
Figure 5B:
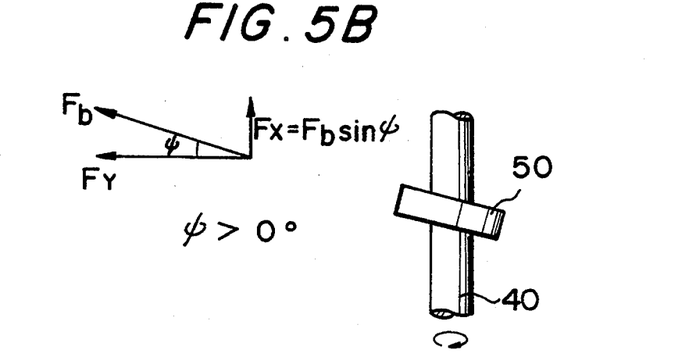
Figure 5C:
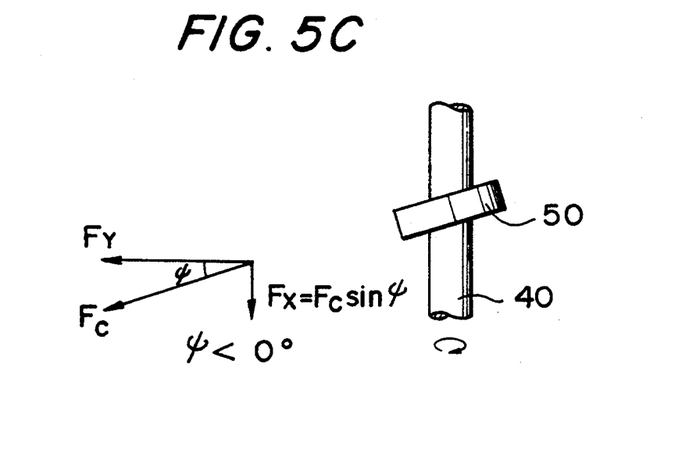

FIG. 5 shows a relationship between the drive force F transmitted to the pressure roller 50 and the cross-angle $\psi$ between the pressure roller 50 and the rotating shaft 40. The cross-angle $\psi$ is determined by using a reference direction (Y-axis) perpendicular to the rotating shaft 40. It is now assumed that the cross-angle $\psi$ is positive in the clockwise direction and negative in the counter-clockwise direction.

The drive force is determined by the cross-angle $\psi$ and a number of revolutions of the pressure roller 50.

Therefore, if the cross-angle $\psi$ at the pressure roller 50 is equal to zero as shown in FIG. 5A, the drive force $F_a$ of the pressure roller 50 becomes perpendicular to the rotating shaft 40. The truck 30 is at rest. However, if the cross-angle $\psi$ is larger or smaller than zero as shown in FIGS. 5B or 5C, the drive force $F_b$ or $F_c$ transmitted to the pressure roller 50 will have a component of force $F_X$ extending in the axial direction of the rotating shaft 40 (X-axis), $F_X=F_b \sin \psi$ or $F_X=F_c \sin \psi$, in addition to the component of force $F_y$ perpendicular to the rotating shaft 40. When such a component of force $F_X$ acts on the truck 30 as a thrust, the truck 30 will move along the axial direction of the rotating shaft 40 at a speed corresponding to the component of force $F_X$.

When the steering wheel 14 is actuated by the player to steer the vehicle 10 in the leftward direction, therefore, the pressure roller 50 crosses the rotating shaft 40 as shown in FIG. 5B. Thus, the vehicle 10 will be translated leftwardly together with the truck 30.

In the contrary, when the steering wheel 14 is actuated to steer the vehicle 10 in the rightward direction, the pressure roller 50 crosses the rotating shaft 40 as shown in FIG. 5C. Thus, the vehicle 10 will be translated rightwardly with the truck 30.

As the steering angle $\psi$ in the vehicle 10 increases, the force $F_X$ acting on the pressure roller 50 in the axial direction of the rotating shaft 40 is also increased. Thus, the vehicle 10 will be translated at an increased speed.

In such an arrangement, the vehicle 10 can be translated at a speed corresponding to the magnitude of the steering angle $\theta$ only by controlling the cross-angle $\psi$ between the pressure roller 50 and the rotating shaft 40 in adaptation to the steering angle $\theta$ in the steering wheel 14.

However, the truck 30 may excessively move in the steered direction and eventually impact the sidewall of the game machine unless the steering wheel 14 is retuned to its neutral position at a proper timing after it has been rotated by the player. In order to avoid such a possibility, the game machine comprises steering release mechanisms 70 (only one shown in FIG. 2) positioned on the opposite sides of the path of movement for the truck 30. Each of the steering release mechanisms 70 is adapted to return the cross-angle $\psi$ of the pressure roller 50 relative to the rotating shaft 40 to its neutral level or zero degrees, thereby stopping the motion of the truck 80.

Figure 6:
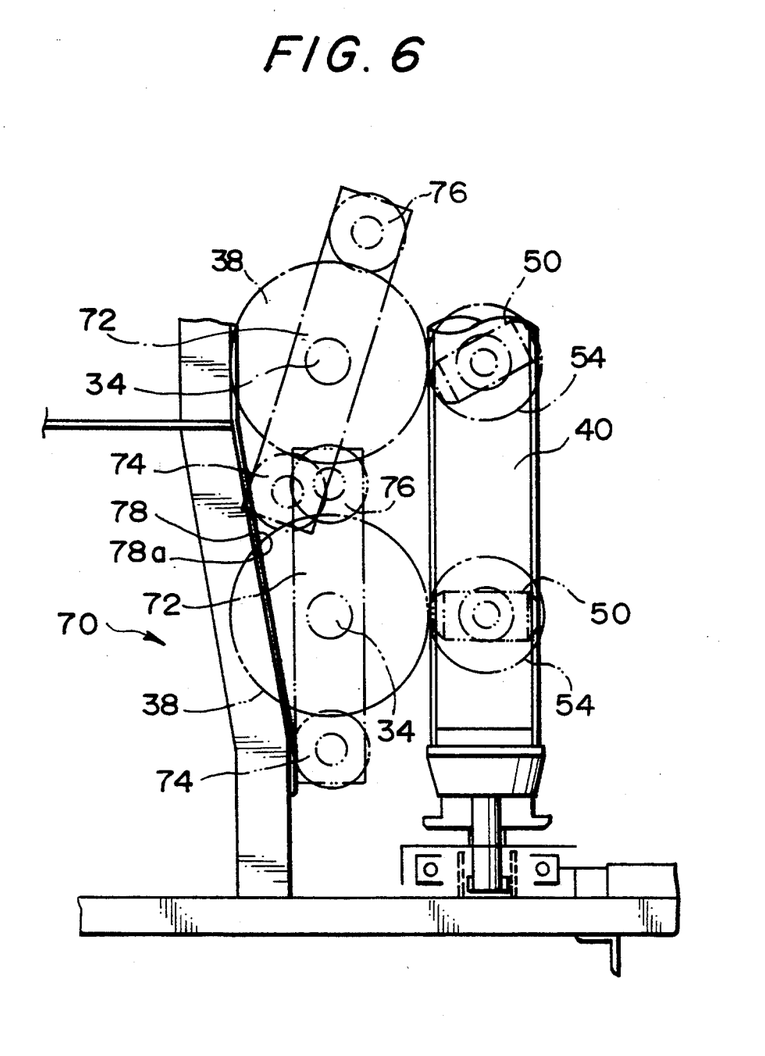
FIG. 6 is a view showing the primary parts of a steering release mechanism usable in the present embodiment.

FIG. 6 shows an enlarged view of parts generally indicated by 200 in FIG. 2. In FIG. 6, a one-dot chain line indicates the steering release mechanism immediately before it is initiated while a two-dot chain line indicates the steering release mechanism after the actuation thereof has been terminated.

As seen from FIG. 4, each of the steering release mechanisms 70 comprises a roller support 72 fixedly mounted on the lower end of the support shaft 34, a pair of guide rollers 74, 76 mounted on the underside of the roller support 72, and a roller guide 78 mounted parallel to the rotating shaft 40.

The roller support 72 is mounted such that it will be disposed parallel to the rotating shaft 40 when the cross-angle of the pressure roller 50 relative to the rotating shaft 40 is equal to zero or in its neutral level.

The roller guide 78 includes tapered guide portions 78a located adjacent the opposite ends of the rotating shaft 40. Each of the tapered guide portions 78a contacts the respective guide rollers 74, 76 to guide them such that the arrangement of the guide rollers 74, 76 will be parallel to the rotating shaft 40. When the guide rollers 74, 76 are guided by the guide portions 78a, the steering angle $\theta$ in the vehicle 10 is controlled to be equal to zero, thereby stopping the motion of the truck 80.

For example, if the steering wheel 14 is rotated rightwardly, the pressure roller 50 will cross the rotating shaft 40 to produce a rightward force, as shown by one-dot chain line in FIG. 6.

This rightward force causes the truck 80 to move transversely in the steered direction of the steering wheel (rightward direction). As the truck 30 reaches near one end of the rotating shaft 40, one of the tapered guide portions 78a contacts the guide roller 74 as shown by two-dot chain line in FIG. 6. Thus, the rollers 74, 76 are guided such that their arrangement will be parallel to the rotating shaft 40. Thus, the support shaft 34 cooperates with the gears 38, 54 to control the pressure roller 50 so that it will be perpendicular to the rotating shaft 40. As a result, the thrust acting on the truck 30 becomes zero to stop the truck 30.

Figure 9:
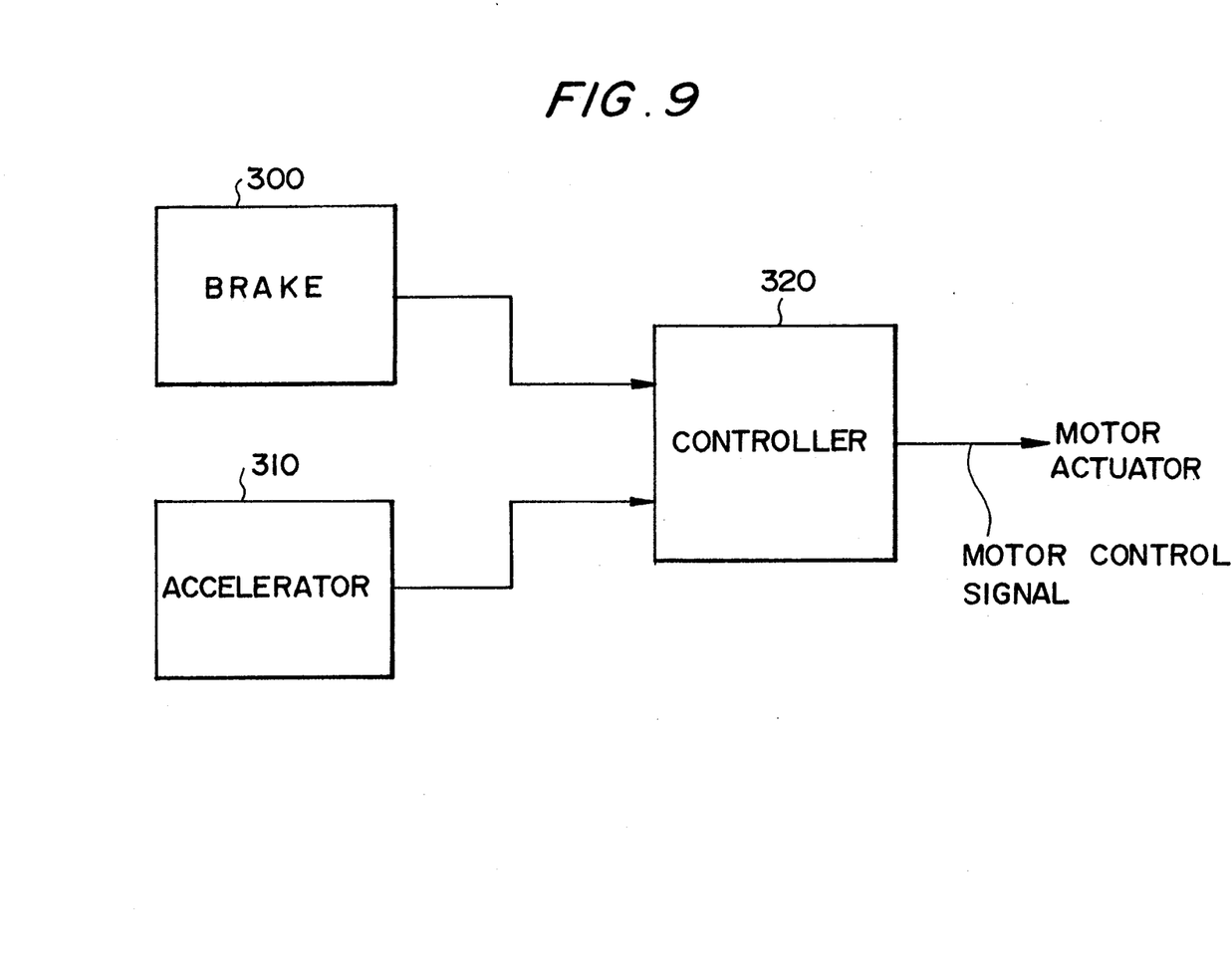
FIG. 9 is a block diagram of an accelerator-brake system usable in the present embodiment.

The present embodiment may be constructed such that when an accelerator is depressed by the player, the rotation of the motor 42 can be increased through a motor control system which will be described with reference to FIG. 9.

Actuation signals are inputted from brake 300 and accelerator 310 to a control circuit 320. When the control circuit 320 receives an actuation signal from the accelerator 310, the control circuit 320 provides a control signal to a motor actuator, the control signal being used to increase the revolution of the motor. On receiving an actuation signal from the brake 300, the control circuit 320 provides, to the motor actuator, a control signal operative to decrease the revolution of the motor. As the accelerator 310 is depressed, the speeds in the endless belt 20 and rotating shaft 40 are increased to change the road and associated scenes more rapidly as if the vehicle runs on the road at a higher speed. At the same time, the transverse thrust on the truck 30 is also increased to translate the vehicle 10 at a speed corresponding to the increased running speed. This can increase an ambience in the drive game. If the brake 300 is depressed, the rotational speeds of the rotating shaft 40 and endless belt 20 can be decreased and eventually stop the motion of the vehicle 10.

In operation, the player first gets on the seat 12 in the vehicle 10 and then enters a coin into the game machine. When the entering of the coin is detected by the game machine, a game start signal is generated to energize the motors 26, 42. Thus, the endless belt 20 is initiated to be moved to change the states of the road and associated scenes which are displayed in front of the vehicle. When the player rotates the steering wheel 14, the vehicle 10 is controlled to run on the displayed road.

Figure 7:
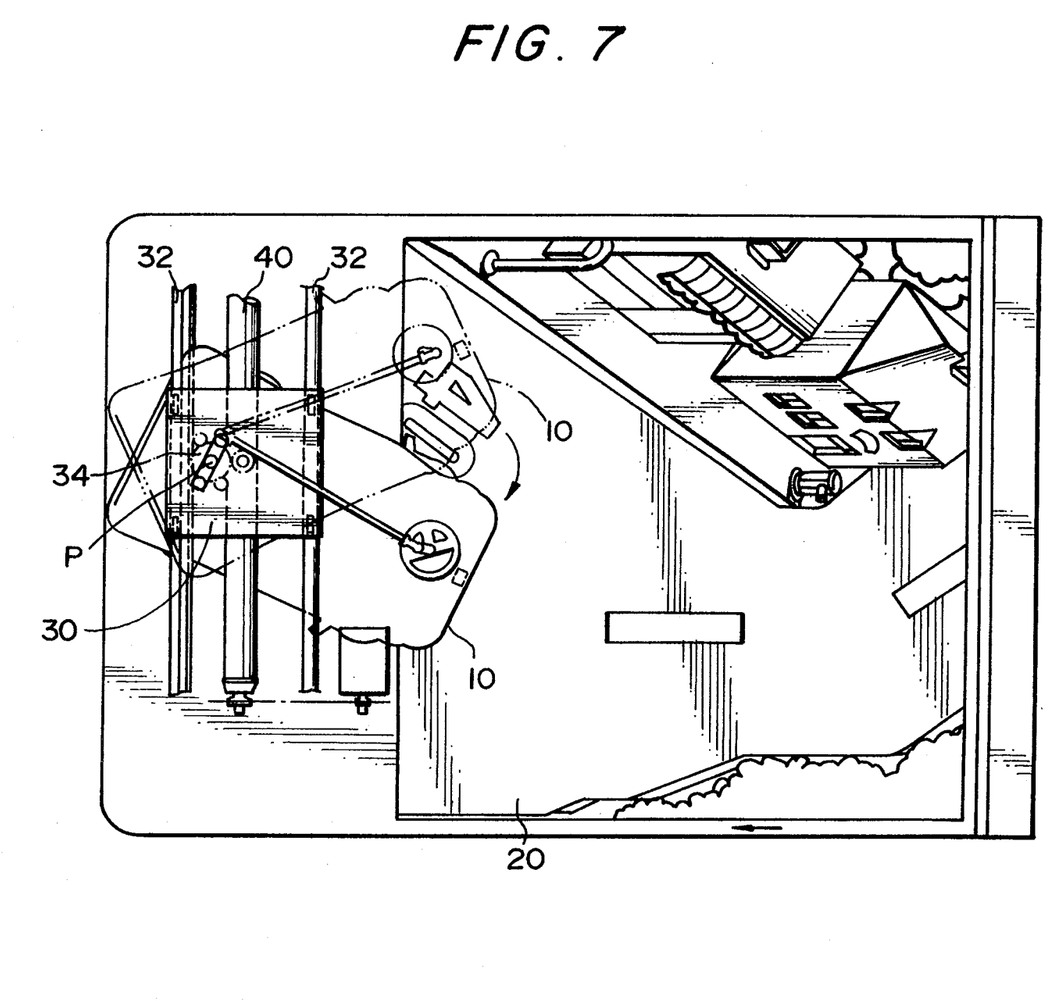
FIG. 7 is a view illustrating the control of steering angle in the vehicle in the present embodiment.
Figure 8:
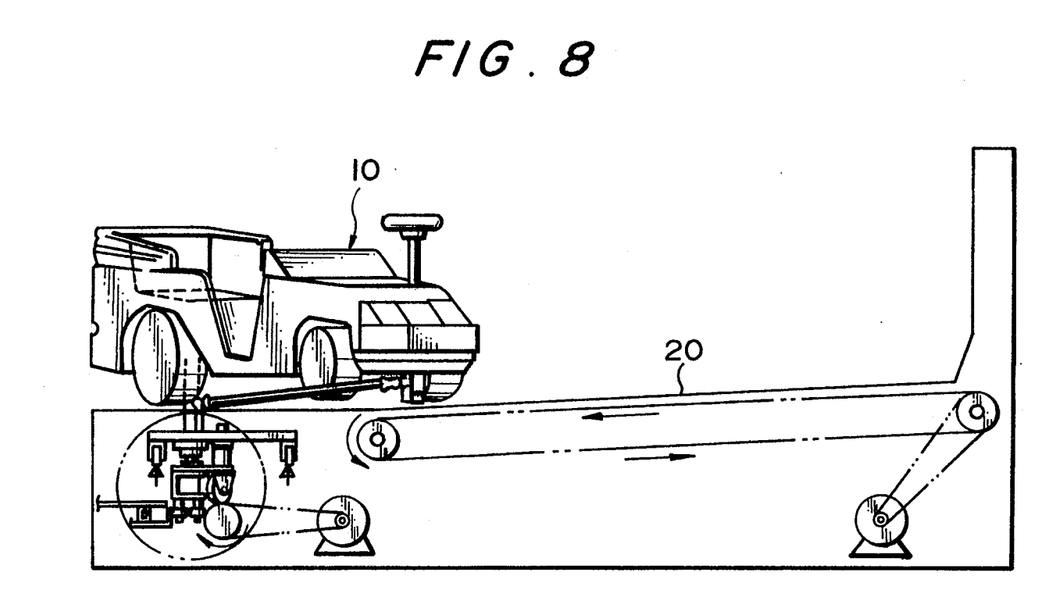
FIG. 8 is a schematic side view of the game machine with the vehicle steered rightwardly in the present embodiment.

FIGS. 7 and 8 illustrate the vehicle 10 being controlled to the display road. For example, if the road curves rightwardly as shown in FIG. 7, the steering wheel 14 is rightwardly rotated by the player. As a result, the vehicle 10 is rightwardly pivoted about the support shaft 82 to turn its orientation. At the same time, the truck 80 causes the vehicle 10 to translate in the rightward direction through the rotation of the pressure roller 50 relative to the rotating shaft 40.

When the steering wheel 14 is rotated to the displayed road in the present embodiment, the vehicle 10 is pivoted in the steered direction and also translated in the same direction at a speed corresponding to the steering angle.

Since the rotational center P is located in the rearward portion of the vehicle 10 in the present embodiment, the vehicle 10 will be changed in its orientation such that the forward portion thereof is more turned when the steering wheel is rotated by the player. This provides a feel of operating the steering wheel as in an actual vehicle.

If the steering wheel 14 is not returned to its original position after rotated, the truck 30 continues to move and will eventually impact the sidewall of the game machine. In the present embodiment, however, the arrangement of the guide rollers 74, 76 is controlled by the roller guide 78 to be parallel to the rotating shaft 40 when the truck 30 reaches near the sidewall. As a result, the orientation of the vehicle 10 is forcedly returned to its original position in which the steering angle θ becomes equal to zero. The truck 30 is forcedly stopped to avoid impact with the sidewall.

The present invention is not limited to the aforementioned embodiment, but may be applied in various modifications and changes without departing from the scope of the invent ion.

For example, the two motors 26, 42 for driving the rotating shaft 40 and endless belt 20 may be replaced by a single motor which can drive both the rotating shaft and endless belt.

Figure 10:
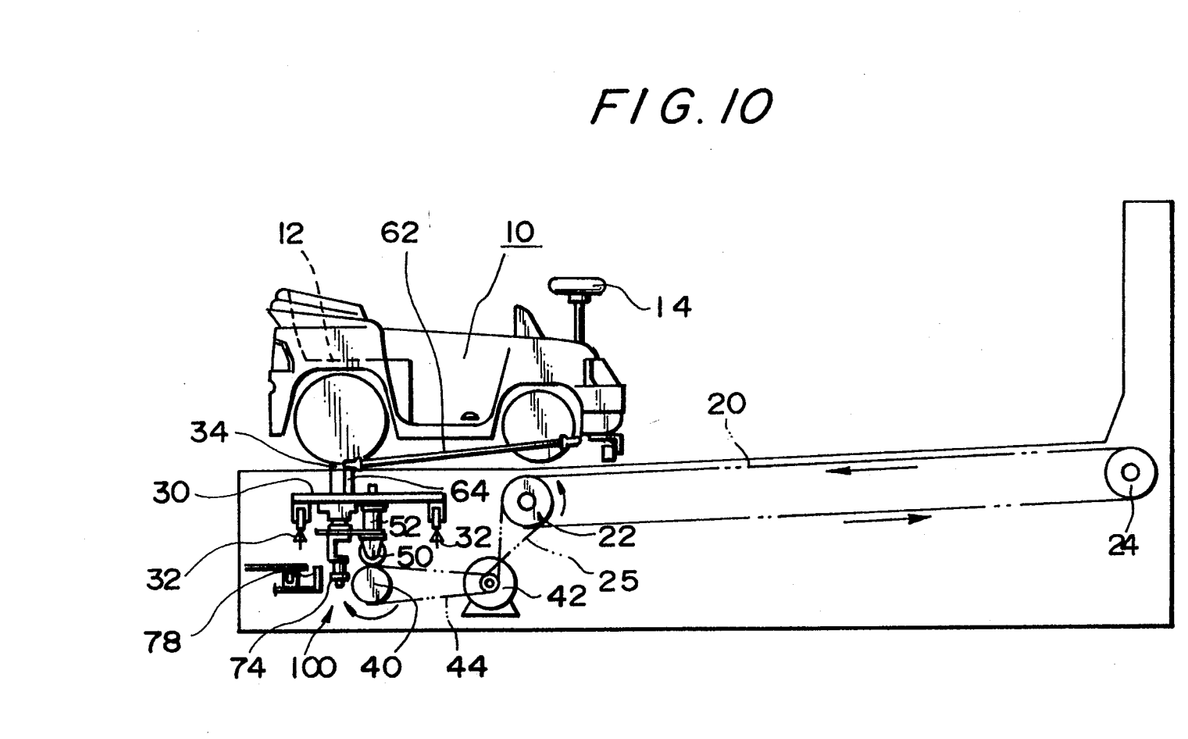
FIG. 10 is a schematic side view showing another embodiment of the present invention.

FIG. 10 shows another embodiment of the present invention which uses such a single motor for driving both the rotating shaft and endless belt. A single motor 42 is operatively connected to the rotating shaft 40 through a belt 44 and at the same time operatively connected to a driven pulley 22 through a belt 25 to drive the pulley 22 in a direction as shown by arrow in FIG. 10. Thus, the single motor 42 can drive both the endless belt 20 and rotating shaft 40.

Although the previous embodiments have been described as to the motor drive of the rotating shaft 40, the present invention may be applied to such a structure that the pressure roller 50 is driven by a motor.

Figure 11:
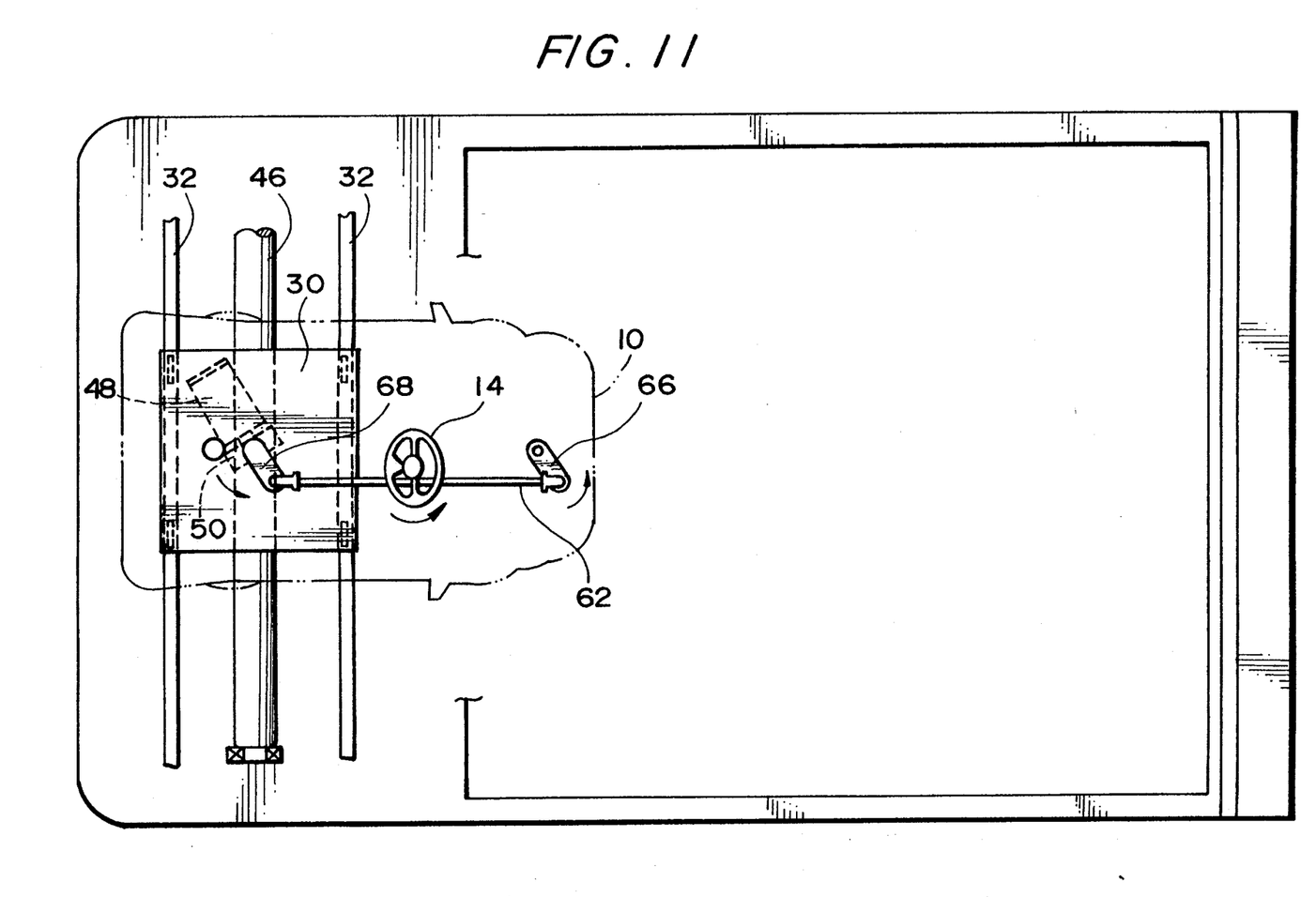
FIG. 11 is a schematic plan view showing still another embodiment of the present invention.
Figure 12:
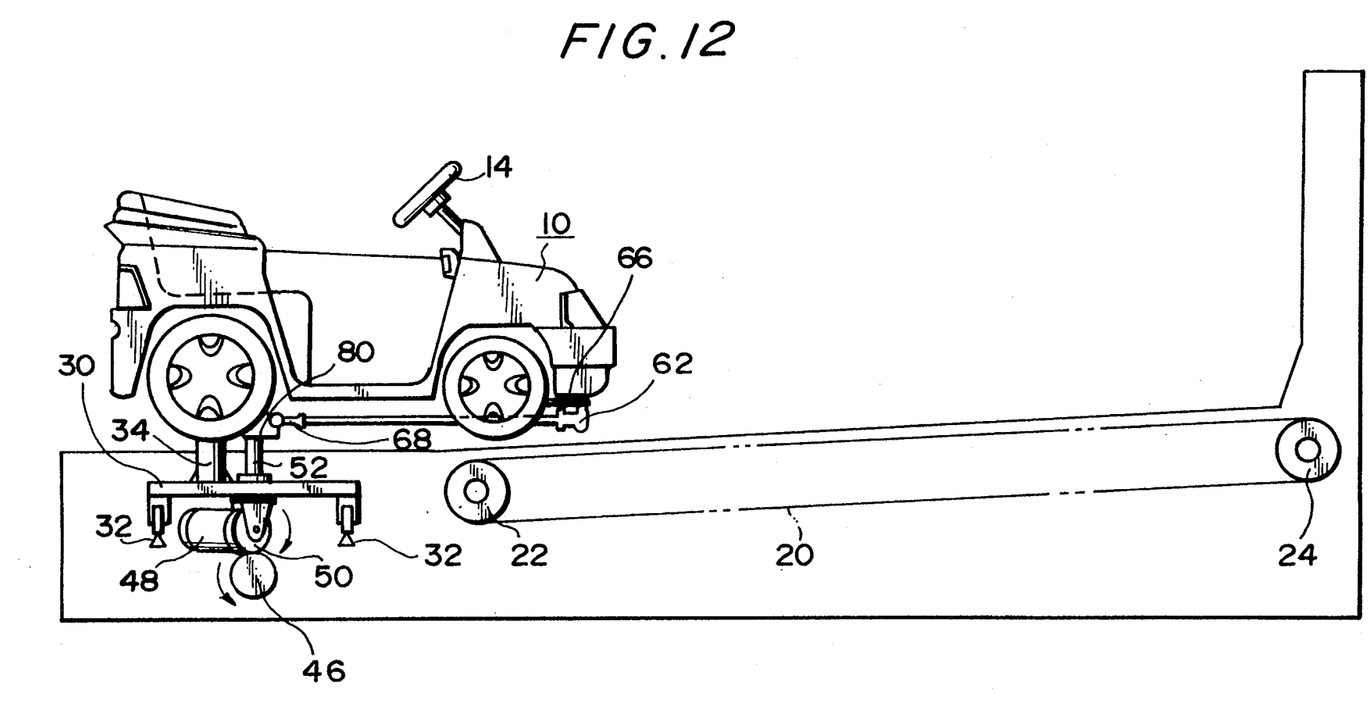
FIG. 12 is a schematic side view of the game machine shown in FIG. 11.

The last-mentioned embodiment Is shown in FIGS. 11 and 12 in which parts similar to those of FIGS. 1-9 are denoted by similar reference numerals and will not be described further.

In the embodiment shown in FIGS. 11 and 12, the pressure roller 50 is rotatably driven by a motor 48 connected directly to the pressure roller 50. The rotating shaft 46 contacting the pressure roller 50 is freely rotatable. A mechanism for transmitting the rotation of the steering wheel 14 comprises a first arm 66 connected to the steering wheel 14 through a shaft, a rod 62 pivotally connected to the first arm 66, and a second arm 68 fixedly connected to the other end of the rod 62. The other end of the second arm 68 is fixedly connected to an arm 80 on the upper end of the support shaft 52 supporting the pressure roller 50.

In the present embodiment, the pressure roller 50 will be rotated with the same direction and angle as those of the steering wheel 14. For example, if the steering wheel 14 is rotated leftwardly as shown in FIG. 11, the first and second arms 66, 68 are also rotated leftwardly. In association with the rotation of the arms, the pressure roller 50 is also rotated in the same direction as that of the steering wheel 14. Unlike the embodiment shown in FIGS. 1-9, the present embodiment is required to set the rotational direction in the pressure roller 50. Furthermore, the rotating shaft 46 may be replaced by belt means frictionally contacting the pressure roller 50.

Although the previous embodiments have been described as to the endless belt 20 used as display means, the present invention may be applied to any other suitable display means such as a large-screen type display.

Figure 13:
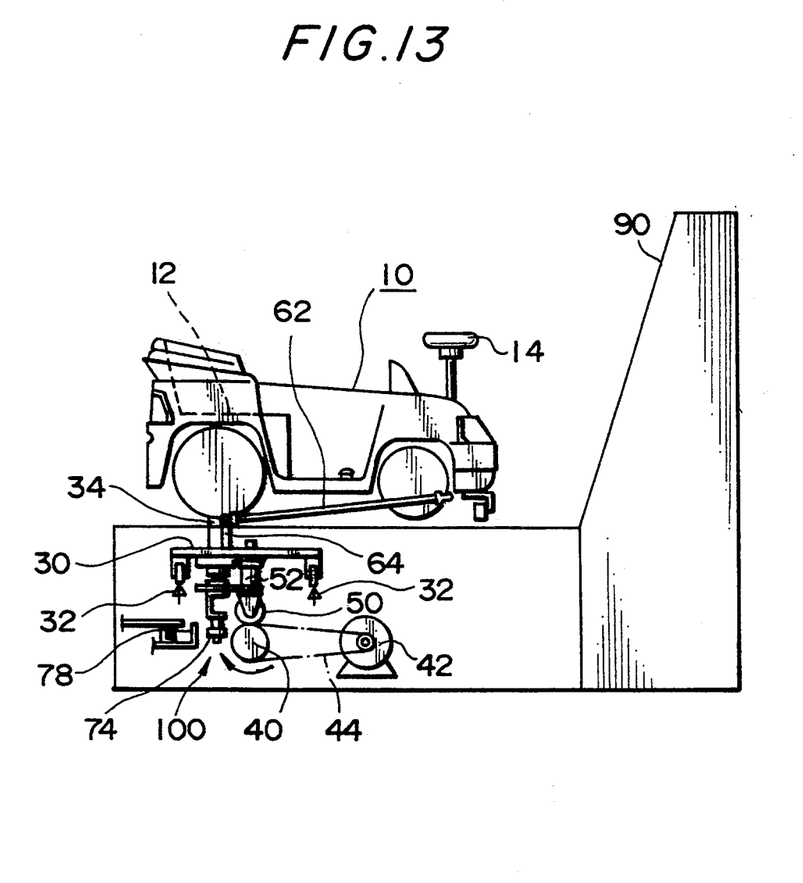
FIG. 13 is a schematic side view showing a further embodiment of the present invention.

FIG. 13 shows a large-screen type display 90 disposed in front of the vehicle 10. This display 90 may be in the form of CRT, liquid crystal display or projector.

Although the previous embodiments have been described as to the drive game machine, the present invention may be applied to any other game machine, if required.

As will be apparent from the foregoing, the present invention can provide a stationary game machine or simplified and inexpensive structure which can control the orientation of a dummy mover on which a player sits when the steering wheel is rotated by the player and also translates the dummy mover in a direction crossing a displayed path of movement.

Particularly, in the typical embodiments or the present invention, the dummy mover can be translated in the direction crossing the path of movement by the combination of rotating shaft substantially parallel to the crossing path with the pressure roller contacting the rotating shaft under pressure. Further, the speed in the translation can be simply adjusted only by changing the cross-anglo. Consequently, the mechanism for translating the dummy mover may be of a simplified and inexpensive structure.

We claim:

1. A stationary game machine comprising:
   a dummy mover having a player's seat;
   display means for displaying a path of movement in front of said dummy mover; and
   means responsive to steering by the player for controlling an orientation of said dummy mover,
   said means for controlling the orientation of said dummy mover comprising:
   a truck section transversely movable in a direction crossing said path of movement, said truck section pivotally supporting said dummy mover so that the orientation of said dummy mover can be controlled;
   an angle control section responsive to steering by the player for controlling a pivoted angle of said dummy mover relative to said truck section;
   a rotating member disposed in a direction crossing said path of movement;
   a pressure roller disposed on said truck section in pressure contact with said rotating member;
   a drive section for rotatably driving at least one of said rotating member and said pressure roller; and
   a cross-angle control section, comprising a steering wheel provided in said dummy mover, a steering shaft, a connecting rod pivotally connected to said steering shaft through an arm and a pole for pivotally connecting said connecting rod to said truck section for controlling a cross-angle of said pressure roller relative to said rotating member such that a component of force acting on said truck section through said pressure roller in said crossing direction will be in the same direction as said steered direction and equal to a value corresponding to said pivoted angle, wherein a rearward portion of said dummy mover is fixedly mounted on a support shaft pivotally supported by said truck section and an operating portion of said cross-angle control section is connected to said support shaft through an intermediate connector and located in a forward portion of said dummy mover, whereby said dummy mover can be steered and transversely moved by the player in said crossing direction such that the forward portion of said dummy mover can be moved faster and further relative to the rearward portion when said operating portion is steered by the player.

2. A stationary game machine as defined in claim 1 wherein said truck section is movably disposed on a pair of guide rails.

3. A stationary game machine as defined in claim 1 wherein said rotating member is a shaft.

4. A stationary game machine as defined in claim 1 wherein said rotating member is a belt.

5. A stationary game machine as defined in claim 1, further comprising steering release means on the opposite sides of the path of movement for said truck section, said steering release means being adapted to return the cross-angle of said pressure roller relative to said rotating shaft to its neutral level, equal to zero degrees, in which the motion of said truck section will be stopped.

6. A stationary game machine as defined in claim 1 wherein said dummy mover is in the form of a vehicle and wherein said game machine is used as a driving game machine.

7. A stationary game machine as defined in claim 1 wherein said display means is in the form of a movable endless belt.

8. A stationary game machine as defined in claim 7 wherein said endless belt has a surface slightly inclined forwardly and downwardly toward said dummy mover.

9. A stationary game machine as defined in claim 1 wherein said display means is a large-screen type display.

10. A stationary game machine as defined in claim 1 wherein said drive section comprises a motor for driving both said rotating member and said display means.

11. A stationary game machine as defined in claim 1, further comprising another control means for controlling the revolution of said drive section under the action of an accelerator or brake, whereby the rotational speed of said drive section can be varied by said another control means.

12. A stationary game machine as defined in claim 1, wherein said cross-angle control section comprises a support shaft for at least supporting said pressure roller such that an angular displacement of said cross-angle control section is transferred directly to said support shaft.

13. A stationary game machine comprising:
a dummy mover having a player's seat;
display means for displaying a path of movement in front of said dummy mover; and
means responsive to the steering by the player for controlling the orientation of said dummy mover,
said means for controlling the orientation of said dummy mover comprising:
a truck section transversely movable in a direction crossing said path of movement, said truck section pivotally supporting said dummy mover so that the orientation of said dummy mover can be controlled;
an angle control section responsive to the steering by the player for controlling the pivoted angle of said dummy mover relative to said truck section;
a rotating member disposed in a direction crossing said path of movement;
a pressure roller disposed on said truck section in pressure contact with said rotating member;
a drive section for rotatably driving at least one of said rotating member and pressure roller; and
a cross-angle control section for controlling a cross-angle of said pressure roller relative to said rotating member, said cross-angle control being provided by angular displacement of a pressure roller support shaft rotatably supported by said truck section, said pressure roller support shaft being rotatably responsive to the rotational direction and angle of said dummy mover, and a dummy mover support shaft, said dummy mover support shaft being connected to said pressure roller support shaft through a power transmitting mechanism,
whereby said dummy mover can be steered and transversely moved by the player in said crossing direction at a speed matching the orientation of said dummy mover.

14. A stationary game machine as defined in claim 13 wherein the rotational angle of said pressure roller support shaft is equal to an absolute value of the cross-angle of said pressure roller.

15. A stationary game machine as defined in claim 13 wherein said power transmitting mechanism comprises at least one of a gear train and a chain.

16. A stationary game machine comprising:
a dummy mover having a player's seat;
display means for displaying a path of movement in front of said dummy mover; and
means responsive to steering by the player for controlling an orientation of said dummy mover,
said means for controlling the orientation of said dummy mover comprising:
a truck section transversely movable in a direction crossing said path of movement, said truck section pivotally supporting said dummy mover so that the orientation of said dummy mover can be controlled;
an angle control section responsive to steering by the player for controlling a pivoted angle of said dummy mover relative to said truck section;
a rotating member disposed in a direction crossing said path of movement;
a pressure roller disposed on said truck section in pressure contact with said rotating member;
a drive section for rotatably driving at least one of said rotating member and said pressure roller; and
a cross-angle control section, comprising a steering wheel provided in said dummy mover, a steering shaft, a connecting rod pivotally connected to said steering shaft through a first arm and a second arm for pivotally connecting said connecting rod to said truck section for controlling a cross-angle of said pressure roller relative to said rotating member such that a component of force acting on said truck section through said pressure roller in said crossing direction will be in the same direction as said steered direction and equal to a value corresponding to said pivoted angle, wherein a rearward portion of said dummy mover is fixedly mounted on a support shaft pivotally supported by said truck section and an operating portion of said cross-angle control section is connected to said support shaft through an intermediate connector and located in a forward portion of said dummy mover, whereby said dummy mover can be steered and transversely moved by the player in said crossing direction such that the forward portion of said dummy mover can be moved faster and further relative to the rearward portion when said operating portion is steered by the player.

17. A stationary game machine as defined in claim 16 wherein said second arm is fixedly connected to an arm extending from said shaft pivotally supported on said truck section, said pressure roller being fixedly mounted on said shaft.

* * * * *